UNITED STATES PATENT OFFICE.

JOHN W. WILLIAMSON, OF JAMAICA, NEW YORK.

COMBINED LUBRICATING AND COOLING COMPOUND.

SPECIFICATION forming part of Letters Patent No. 278,067, dated May 22, 1883.

Application filed February 26, 1883. (No specimens.)

*To all whom it may concern:*

Be it known that I, JOHN W. WILLIAMSON, a citizen of the United States, residing at Jamaica, in the county of Queens and State of New York, have invented a certain new and useful Combined Lubricating and Cooling Compound, of which the following is a correct specification.

The object of my improvement is to produce a combined lubricating compound and cooler for the bearings of machinery and other similar purposes; and it consists, essentially, of a mixture of animal or vegetable oil, or both, with a mineral oil combined with a solution of caustic soda or similar substance and talc and plumbago or similar substances. I have found the compound resulting from the mixture of these substances forms a superior combined lubricant and cooler, which can be applied to all the purposes for which lubricants are adapted.

I prefer to make my said compound in quantities of about twenty-five hundred pounds, and to make such quantity I take two hundred pounds of melted tallow and one thousand pounds of any suitable mineral oil and mix them thoroughly together, and in the mixture put about one hundred and twenty-eight pounds of a solution of caustic soda. To this I add about eleven hundred and fifty pounds of talc and about thirty pounds of plumbago, and mix the whole thoroughly together. When thus compounded the mixture, if not absolutely smooth, should be rendered so by passing it through a mill. In making a greater or less quantity the quantities of these several ingredients and substances must of course be varied, about the same relative proportions, however, being observed between them, though I do not intend to confine myself strictly to the quantities or portions of such ingredients or substances.

Instead of melted tallow, any animal or vegetable oil, grease, or fat, or a mixture of the same, may be used, and equivalents may also be used for the substances—caustic soda, talc, and plumbago—though I prefer the specific substances.

I am aware of the patents to Mandel, No. 157,848, December 15, 1874; Minzer, No. 198,664, December 25, 1877; Hamill, No. 38,822, June 29, 1863; and Millschaw, No. 115,342, May 30, 1871—oils, fats, and glue, their composition, combination, and arrangement of their respective parts—and I therefore do not claim, broadly, the same; but What I do claim is—

The combination of melted tallow, mineral oil, caustic soda, talc, and plumbago, in the proportion set forth, compounded and treated substantially in the manner described.

In testimony whereof I have hereunto set my hand this 21st day of February, 1883.

JNO. W. WILLIAMSON.

In presence of—
CHARLES G. COE,
JAS. J. CAMPBELL.